United States Patent
Applebaum et al.

(10) Patent No.: US 6,463,413 B1
(45) Date of Patent: Oct. 8, 2002

(54) SPEECH RECOGNITION TRAINING FOR SMALL HARDWARE DEVICES

(75) Inventors: Ted H. Applebaum; Jean-Claude Junqua, both of Santa Barbara, CA (US)

(73) Assignee: Matsushita Electrical Industrial Co., Ltd., Kadoma (JP)

(*) Notice: Subject to any disclaimer, the term of this patent is extended or adjusted under 35 U.S.C. 154(b) by 0 days.

(21) Appl. No.: 09/295,276

(22) Filed: Apr. 20, 1999

(51) Int. Cl.[7] ............................................. G10L 15/14
(52) U.S. Cl. .................. 704/256; 704/255; 704/270; 704/275; 704/252; 704/243
(58) Field of Search ................. 704/256, 245, 704/254, 243, 244, 255, 252, 253, 257, 270, 275

(56) References Cited

U.S. PATENT DOCUMENTS

| | | | |
|---|---|---|---|
| 4,751,737 A | | 6/1988 | Gerson et al. |
| 4,754,326 A | * | 6/1988 | Kram et al. ................. 364/900 |
| 4,829,577 A | * | 5/1989 | Kuroda et al. .............. 704/256 |
| 4,903,305 A | | 2/1990 | Gillick et al. |
| 5,477,511 A | * | 12/1995 | Englehardt .................... 369/25 |
| 5,488,652 A | | 1/1996 | Bielby et al |
| 5,497,447 A | * | 3/1996 | Bahl et al. .................. 704/245 |
| 5,684,925 A | | 11/1997 | Morin et al. |
| 5,715,367 A | * | 2/1998 | Gillick et al. ............... 704/254 |
| 5,749,072 A | * | 5/1998 | Mazukiewicz et al. ..... 704/275 |
| 5,806,030 A | * | 9/1998 | Junqua ....................... 704/245 |
| 5,822,728 A | * | 10/1998 | Applebaum et al. ........ 704/254 |
| 5,825,977 A | | 10/1998 | Morin et al. |
| 5,839,107 A | | 11/1998 | Gupta et al. |
| 5,850,627 A | | 12/1998 | Gould et al. |
| 5,854,997 A | * | 12/1998 | Sukeda et al. ................ 704/3 |
| 5,864,810 A | | 1/1999 | Digalakis et al. |
| 5,884,262 A | * | 3/1999 | Wise et al. .................. 704/270 |
| 5,950,157 A | * | 9/1999 | Heck et al. .................. 704/234 |
| 6,055,498 A | * | 4/2000 | Neumeyer et al. .......... 704/246 |
| 6,070,140 A | * | 5/2000 | Tran ........................... 704/275 |
| 6,266,642 B1 | * | 7/2001 | Franz et al. ................. 704/277 |

OTHER PUBLICATIONS

Morin P., T.H. Applebaum, R. Bowman, Y. Zhao, and J.–C. Junqua, "Robust and Compact Multilingual Word Recognizers Using Features Extracted From a Phoneme Similarity Front–End", 1998.

Applebaum, T.H., P. Morin, and B.A. Hanson, "A Phoneme–Similarity Based ASR Front–End", 1996, vol. 1, pp. 33–36.

Morin, P. and T.H. Applebaum, "Word Hypothesizer Based on Reliably Detected Phoneme Similarity Regions", 1995, pp. 897–900.

\* cited by examiner

Primary Examiner—Vijay B Chawan
(74) Attorney, Agent, or Firm—Harness, Dickey & Pierce, P.L.C.

(57) ABSTRACT

A distributed speech processing system for constructing speech recognition reference models that are to be used by a speech recognizer in a small hardware device, such as a personal digital assistant or cellular telephone. The speech processing system includes a speech recognizer residing on a first computing device and a speech model server residing on a second computing device. The speech recognizer receives speech training data and processes it into an intermediate representation of the speech training data. The intermediate representation is then communicated to the speech model server. The speech model server generates a speech reference model by using the intermediate representation of the speech training data and then communicates the speech reference model back to the first computing device for storage in a lexicon associated with the speech recognizer.

32 Claims, 2 Drawing Sheets

US 6,463,413 B1

SPEECH RECOGNITION TRAINING FOR SMALL HARDWARE DEVICES

BACKGROUND AND SUMMARY OF THE INVENTION

The present invention relates generally to speech recognition systems, and more particularly, the invention relates to a system for training a speech recognizer for use in a small hardware device.

The marketing of consumer electronic products is very cost sensitive. Reduction of the fixed program memory size, the random access working memory size or the processor speed requirements results in lower cost, smaller and more energy efficient electronic devices. The current trend is to make these consumer products easier to use by incorporating speech technology. Many consumer electronic products, such as personal digital assistants (PDA) and cellular telephones, offer ideal opportunities to exploit speech technology, however they also present a challenge in that memory and processing power is often limited within the host hardware device. Considering the particular case of using speech recognition technology for voice dialing in cellular phones, the embedded speech recognizer will need to fit into a relatively small memory footprint.

To economize memory usage, the typical embedded speech recognition system will have very limited, often static vocabulary. In this case, condition-specific words, such as names used for dialing a cellular phone, could not be recognized. In many instances, the training of the speech recognizer is more costly, in terms of memory required or computational complexity, than is the speech recognition process. Small low-cost hardware devices that are capable of performing speech recognition may not have the resources to create and/or update the lexicon of recognized words. Moreover, where the processor needs to handle other tasks (e.g., user interaction features) within the embedded system, conventional procedures for creating and/or updating the lexicon may not be able to execute within a reasonable length of time without adversely impacting the other supported tasks.

The present invention addresses the above problems through a distributed speech recognition architecture whereby words and their associated speech models may be added to a lexicon on a fully customized basis. In this way, the present invention achieves three desirable features: (1) the user of the consumer product can add words to the lexicon, (2) the consumer product does not need the resources required for creating new speech models, and (3) the consumer product is autonomous during speech recognition (as opposed to during speech reference training), such that it does not need to be connected to a remote server device.

To do so, the speech recognition system includes a speech recognizer residing on a first computing device and a speech model server residing on a second computing device. The speech recognizer receives speech training data and processes it into an intermediate representation of the speech training data. The intermediate representation is then communicated to the speech model server. The speech model server generates a speech reference model by using the intermediate representation of the speech training data and then communicates the speech reference model back to the first computing device for storage in a lexicon associated with the speech recognizer.

For a more complete understanding of the invention, its objects and advantages refer to the following specification and to the accompanying drawings.

DETAILED DESCRIPTION OF THE PREFERRED EMBODIMENTS

The techniques employed by the present invention can be applied in a number of useful applications. For illustration purposes, a preferred embodiment of the invention will first be described within a personal digital assistant (PDA) application. Following this description, another example of a preferred embodiment will be presented in the context of a cellular telephone application. Of course, it will be appreciated that the principles of the invention can be employed in a wide variety of other applications and consumer products in which speech recognition is employed.

Figure 1:
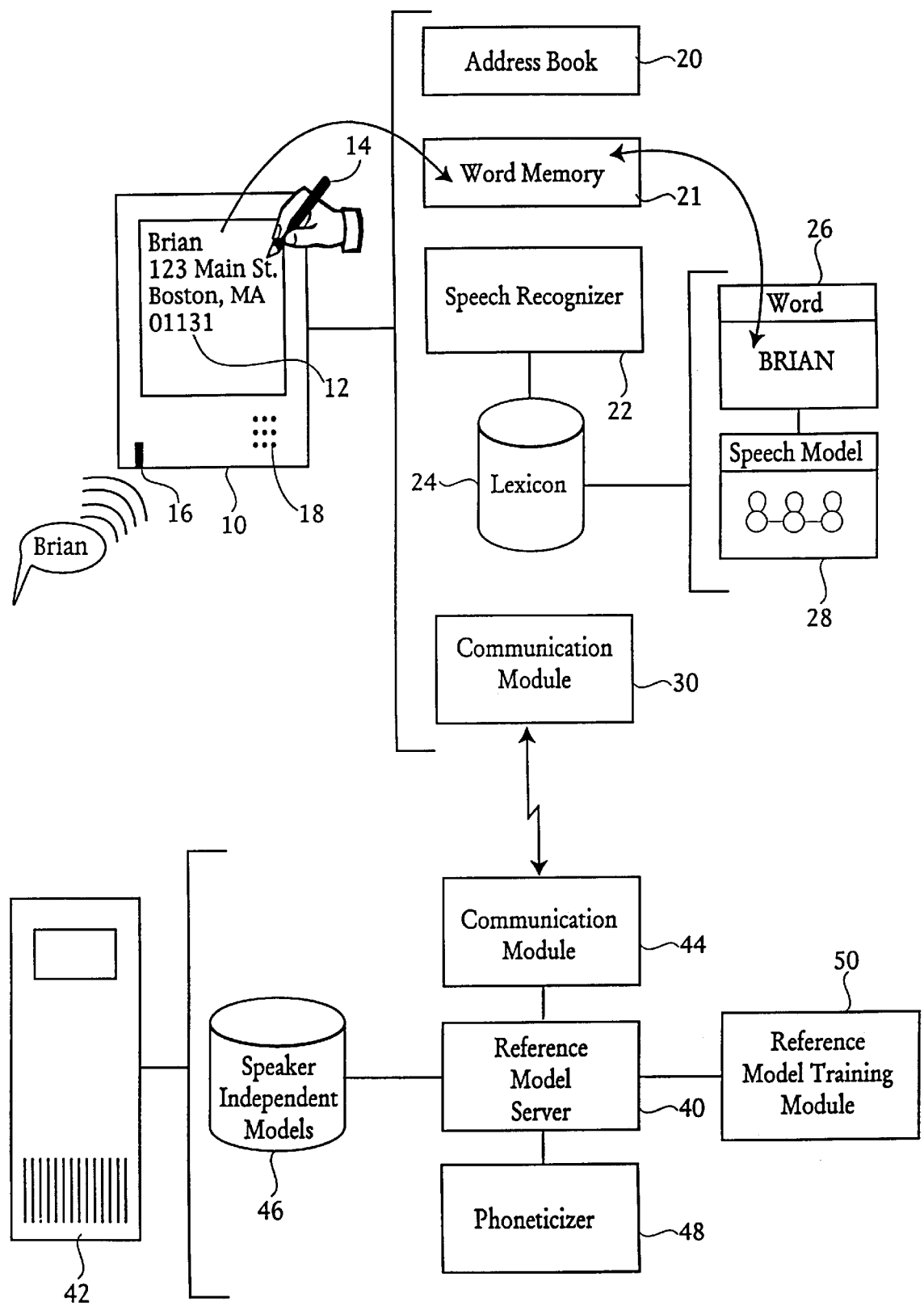
FIG. 1 is a diagram illustrating a personal digital assistant in the context of a distributed speech recognition system in accordance with the present invention.

Referring to FIG. 1, a personal digital assistant device is illustrated at 10. The device has a display screen 12 that presents information to the user and on which the user can enter information by writing on the display using a stylus 14. The personal digital assistant 10 includes a handwriting recognition module that analyzes the stroke data entered by the user via the stylus. The handwriting recognition module converts the handwritten stroke data into alphanumeric text that may be stored in a suitable form (e.g., ASCII format) within a portion of the random access memory contained within the PDA 10.

In a typical PDA device, the operating system of the device manages the non-volatile memory used for storing data entered by the user. Although the precise configuration and layout of this non-volatile memory is dependent on the particular operating system employed, in general, a portion of memory is allocated for storing alphanumeric data entered by the user in connection with different applications. These applications include address books, e-mail address directories, telephone dialers, scheduling and calendar applications, personal finance applications, Web-browsers and the like. For illustration purposes, an address book application 20 is illustrated in FIG. 1. When the user enters names, addresses and phone numbers using the stylus, the alphanumeric data corresponding to the user-entered information is stored in a portion of the system's non-volatile random access memory which has been designated as word memory 21 in FIG. 1.

The PDA 10 of the present embodiment is a speech-enabled device. It includes a microphone 16, preferably housed within the device to allow the user to enter speech commands and enter speech data as an alternative to using the stylus. For instance, the user may speak the name of a person whose address and telephone number they want to retrieve from their address book. Preferably, the PDA 10 also includes an integral speaker 18 through which digitally recorded audio data and synthesized speech data can be transmitted to the user.

Speech data entered through microphone 16 is processed by a speech recognizer module 22 within the PDA 10. The speech recognizer may be a stand alone application running on the PDA device, or it may be incorporated into the operating system of the PDA device. There are a variety of different speech templates upon which speech recognizer 22 may be based. Hidden Markov Models (HMMs) are popular today and may be used to implement the illustrated embodiment. Alternatively, other templates can be employed, such as a model based on high similarity regions as proposed by Morin et al. in U.S. Pat. Nos. 5,684,925, 5,822,728 and 5,825,977 which are incorporated herein by reference.

Speech recognizer 22 works in conjunction with a locally stored lexicon 24 of words that may be recognized by the system. The lexicon 24 is arranged such that there is a speech model associated with each word that is recognizable by the system. This arrangement is illustrated in FIG. 1 by a data structure that associates a unit of word data 26 with a corresponding speech model 28. In this way, the speech recognizer 22 retrieves the alphanumeric text for the word that matches the input speech data. In the case of the address book, the application 20 can retrieve the appropriate address and telephone number using the alphanumeric text for the spoken name as provided by the speech recognizer 22.

The personal digital assistant 10 presents a challenge of trying to achieve each of the previously described desirable features. Thus, the PDA 10 employs a distributed speech recognition architecture whereby words and their associated speech models may be added to lexicon 24 on a fully customized basis. Using the stylus or other suitable input device, such as a keyboard, the user enters words into word memory 21. The system then acquires speech reference models corresponding to those words by accessing a second computing device.

In the presently preferred embodiment, a reference model server supplies the speech models for newly entered words. The reference model server 40 may be implemented on a suitable host server computer 42, typically at a remote site. The PDA 10 and server computer 42 communicate with one another by suitable communication modules 30 and 44. In this regard, the communication modules can take many forms in order to support popular communication hardware and software platforms. For instance, the PDA 10 and server computer 42 may be configured to communicate with one another through a RS232 interface in which the PDA 10 plugs into a cradle connected by is cable to a serial port of the server computer 42. The PDA 10 and host computer 42 may also communicate via a public telephone network or a cellular telephone network using suitable modems. Alternatively, the PDA 10 and host computer 42 may communicate through infrared link, Ethernet or other suitable hardware platform using common communication protocals (e.g., TCP/IP). In this way, the personal digital assistant 10 and server computer 42 may be configured to communicate with each other over the Internet.

The reference model server 40 preferably includes a database of speaker independent models 46, comprising a relatively extensive set of words and their associated speech reference models. When the user enters a new word in the PDA 10, the word is communicated via communication modules 30 and 44 to the reference model server 40. If the user-supplied word is found in the database 46, the speech model corresponding to that word may be transferred to the PDA through the communication modules. The PDA then stores the newly acquired speech reference model in its lexicon 24, such that the speech reference model is associated with the user-supplied word as illustrated by data structures 26 and 28.

In the event the user-supplied word is not found in the database 46, the system will generate a speech reference model for the word. To do so, the system employs a phoneticizer 48 and a reference model training module 50. First, the phoneticizer 48 parses the letters that make up the word and then employs a decision tree network to generate one or more hypothesized pronunciations (i.e., phonetic transcriptions) of the user-entered word. This set of synthesized pronunciations then serves as input to the reference model training module 50 which in turn creates a new speech reference model is based on the speech model template associated with the reference model training module 50. In a preferred embodiment, Hidden Markov Model (HMM) is used as the speech model template for the training module 50. The reference model training module 50 may also employ a procedure for ascertaining the optimal speech model for the phonetic transcription input.

Alternatively, if the user-entered word is not found in the database 46, the system may generate a speech reference model based on speech training data that corresponds to the user-supplied word. In this case, the user speaks the word for which the new speech reference model is desired. The system receives the user-supplied word as audio data via the microphone 18. Speech recognizer 22 converts the audio data into a digitized input signal and then into a parameterized intermediate form. In a preferred embodiment of the present invention, the intermediate representation of the word is a vector of parameters representing the short term speech spectral shape of the audio data. The vector of parameters may be further defined as, but not limited to pulse code modulation (PCM), $\mu$-law encoded PCM, filter bank energies, line spectral frequencies, linear predictive coding (LPC) cepstral coefficients or other types of cepstral coefficients. One skilled in the art will readily recognize that the system may prompt the user for one or more utterances of the user-supplied word in order to provide ample speech training data. In this case, the intermediate representation of the word is comprised of a sequence of vectors having one sequence for each training repetition. When the word is not found in the lexicon, the intermediate form is then communicated via communication module 30 and 44 to the reference model server 40.

The reference model server 40 passes the intermediate representation of the word to the reference model training module 50, where a speech model is constructed using the speech model template. To construct a speech model, the reference model training module 50 may decode the time series of parameter vectors in the speech training data by comparison to a set of phonetic Hidden Markov Models, thereby obtaining a phonetic transcription of the utterance in the speech training data. In this case, the transcription serves as the speech reference model. Alternatively, the reference model training module 50 may align the time series of parameter vectors for each repetition of the speech utterance in the speech training data as is well known in the art. In this case, the reference model training module 50 computes the mean and variance of each parameter at each time interval and then constructs the speech reference model from these means and variances (or functions of these means and variances). In either case, the newly constructed speech reference model is thereafter sent back over the communication link to the PDA. Finally, the new speech reference model along with the alphanumeric representation of the user-supplied word is added to lexicon 24.

Figure 2:
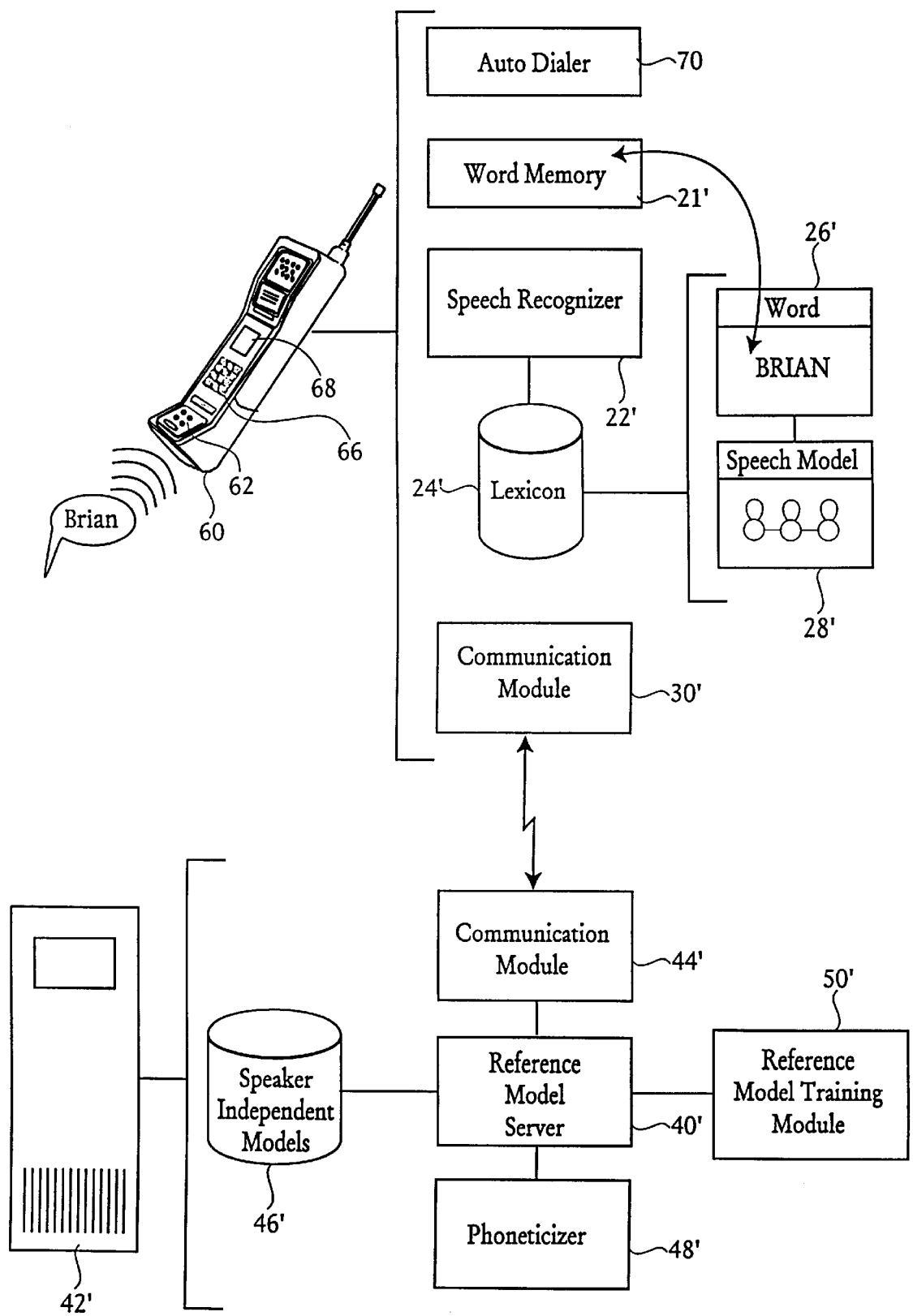
FIG. 2 is a diagram illustrating a cellular telephone in the context of the distributed speech recognition system of the present invention.

A second preferred embodiment of the present invention will be described in relation to a cellular telephone application as shown in FIG. 2. The cellular telephone handset device 60 contains an embedded microphone 62 for receiving audio data from the user and an embedded speaker 64 for transmitting audio data back to the user. The handset device 60 also includes a telephone keypad 66 for dialing or for entering other information, as well as a small liquid crystal display screen 68 that presents information to the user. Thus, the cellular telephone lends itself to different types of embedded speech-enabled applications.

Although various types of speech-enabled applications are envisioned, an automatic voice dialing feature is illustrated in FIG. 2. To voice dial the telephone, a user merely speaks the name of the person they wish to call. The audio data corresponding to the spoken name is then processed by a speech recognizer module 22' within the handset device 60. The speech recognizer 22' works in conjunction with a locally stored lexicon 24' of words that may be recognized by the system. As shown in FIG. 2, the lexicon 24' is arranged according to a data structure that associates each recognizable word with a corresponding speech reference model.

If the name is recognized by the speech recognizer 22', the alphanumeric representation of the spoken word is passed along to an automatic dialer module 70. A portion of the system's non-volatile random access memory is used to maintain a mapping between names and telephone numbers. The automatic dialer module 70 accesses this memory space to retrieve the telephone number that corresponds to the alphanumeric representation of the spoken name and then proceeds to dial the telephone number. In this way, the user is able to automatically voice dial the cellular telephone.

The cellular telephone also presents a challenge of trying to achieve each of the previously identified desirable features. Again, the cellular telephone employs a distributed speech recognition architecture whereby words and their associated speech models may be added to lexicon 24' on a fully customized basis. When the user-supplied name is not found in the lexicon 24', the user may enter the name by using either the keypad 66 or some other suitable input device. The alphanumeric data corresponding to the name is stored in a portion of the system's non-volatile random access memory which has been designated as word memory 21'. The name is then communicated via communication modules 30' and 44' to the reference model server 40'.

As previously described, the reference model server 40 passes the intermediate representation of the name to the reference model training module 50', where a speech model is constructed using the speech model template. Thereafter, the newly constructed speech reference model is sent back over the communication link to the telephone handset device 60. Finally, the speech reference model along with a corresponding user-supplied word is added to lexicon 24' of the telephone handset device 60.

For an automatic voice dialing application, it is envisioned that the lexicon 24' may also be configured to associate telephone numbers, rather than names, with a speech reference model. When the user speaks the name of the person they wish to call, the speech recognizer 22' works in conjunction with the lexicon 24' to retrieve the telephone number that corresponds to the spoken name. The telephone number is then directly passed along to the automatic dialer module 70.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

What is claimed is:

1. A speech processing system for constructing speech recognition reference models, comprising:
    a speech recognizer residing on a first computing device;
    said speech recognizer receiving speech training data and processing the speech training data into an intermediate representation of the speech training data, said speech recognizer further being operative to communicate the intermediate representation to a second computing device;
    a speech model server residing on said second computing device, said second computing device being interconnected via a network to said first computing device;
    said speech model server receiving the intermediate representation of the speech training data and generating a speech reference model using the intermediate representation, said speech model server further being operative to communicate the speech reference model to said first computing device; and
    a lexicon coupled to said speech recognizer for storing the speech reference model on said first computing device.

2. The speech processing system of claim 1 wherein said speech recognizer receives alphanumeric text that serves as the speech training data and said intermediate representation of the speech training data being a sequence of symbols from said alphanumeric text.

3. The speech processing system of claim 1 wherein said speech recognizer captures audio data that serves as the speech training data and digitizes the audio data into said intermediate representation of the speech training data.

4. The speech processing system of claim 1 wherein said speech recognizer captures audio data that serves as the speech training data and converts the audio data into a vector of parameters that serves as said intermediate representation of the speech data, where the parameters are indicative of the short term speech spectral shape of said audio data.

5. The speech processing system of claim 4 wherein said vector of parameters is further defined as either pulse code modulation (PCM), $\mu$-law encoded PCM, filter bank energies, line spectral frequencies, or cepstral coefficients.

6. The speech processing system of claim 1 wherein said speech model server further comprises a speech model database for storing speaker-independent speech reference models, said speech model server being operative to retrieve a speech reference model from said speech model database that corresponds to the intermediate representation of said speech training data received from said speech recognizer.

7. The speech processing system of claim 1 wherein said speech model server further comprises:
    a phoneticizer receptive of the intermediate representation for producing a plurality of phonetic transcriptions; and
    a model trainer coupled to said phoneticizer for building said speech reference model based on said plurality of phonetic transcriptions.

8. The speech processing system of claim 4 wherein said speech model server further comprises:
    a Hidden Markov Model (HMM) database for storing phone model speech data corresponding to a plurality of phonemes; and
    a model trainer coupled to said HMM database for decoding the vector of parameters into a phonetic transcription of the audio data, whereby said phonetic transcription serves as said speech reference model.

9. The speech processing system of claim 1 wherein said speech recognizer captures at least two training repetitions of audio data that serves as the speech training data and converts the audio data into a sequence of vectors of parameters that serves as said intermediate representation of the speech training data, where each vector corresponds to a training repetition and the parameters are indicative of the short term speech spectral shape of said audio data.

10. The speech processing system of claim 9 wherein said speech model server being operative to determine a reference vector from the sequence of vectors, align each vector in the sequence of vectors to the reference vector, determine a mean and a variance of each parameter in the reference vector computed over the values in the aligned vectors, thereby constructing said speech reference model from the sequence of vectors.

11. A distributed speech processing system for supporting applications that reside on a personal digital assistant (PDA) device, comprising:

an input means for capturing speech training data at the PDA;

a speech recognizer coupled to said input means and receptive of speech training data from said input means;

said speech recognizer being operative to process the speech training data into an intermediate representation of the speech training data and communicate the intermediate representation to a second computing device;

a speech model server residing on said second computing device, said second computing device being interconnected via a network to the PDA;

said speech model server receiving the intermediate representation of the speech training data and generating a speech reference model using the intermediate representation, said speech model server further being operative to communicate the speech reference model to said first computing device; and a lexicon coupled to said speech recognizer for storing the speech reference model on the PDA.

12. The distributed speech processing system of claim 11 wherein said input means is further defined as:

a stylus;

a display pad for capturing handwritten stroke data from the stylus; and a handwritten recognition module for converting handwritten stroke data into alphanumeric data, whereby the alphanumeric data serves as speech training data.

13. The distributed speech processing system of claim 12 wherein said speech recognizer segments the alphanumeric data into a sequence of symbols which serves as the intermediate representation of the speech training data.

14. The distributed speech processing system of claim 11 wherein said speech model server further comprises a speech model database for storing speaker-independent speech reference models, said speech model server being operative to retrieve a speech reference model from said speech model database that corresponds to the intermediate representation of said speech training data received from said speech recognizer.

15. The distributed speech processing system of claim 11 wherein said speech model server further comprises:

a phoneticizer receptive of the intermediate representation for producing a plurality of phonetic transcriptions; and a model trainer coupled to said phoneticizer for building said speech reference model based on said plurality of phonetic transcriptions.

16. The distributed speech processing system of claim 11 wherein said input means is further defined as a microphone for capturing audio data that serves as speech training data.

17. The distributed speech processing system of claim 16 wherein said speech recognizer converts the audio data into a digital input signal and translates the digital input signal into a vector of parameters which serves as the intermediate representation of the speech training data, said parameters being indicative of the short term speech spectral shape of said audio data.

18. The distributed speech processing system of claim 17 wherein said vector of parameters is further defined as either pulse code modulation (PCM), $\mu$-law encoded PCM, filter bank energies, line spectral frequencies, or cepstral coefficients.

19. The distributed speech processing system of claim 11 wherein said speech model server further comprises:

a Hidden Markov Model (HMM) database for storing phone model speech data corresponding to a plurality of phonemes; and a model trainer coupled to said HMM database for decoding said vector of parameters into a phonetic transcription of the audio data, whereby said phonetic transcription serves as said speech reference model.

20. The speech processing system of claim 11 wherein said speech recognizer captures at least two training repetitions of audio data that serves as the speech training data and converts the audio data into a sequence of vectors of parameters that serves as said intermediate representation of the speech training data, where each vector corresponds to a training repetition and the parameters are indicative of the short term speech spectral shape of said audio data.

21. The speech processing system of claim 20 wherein said speech model server being operative to determine a reference vector from the sequence of vectors, align each vector in the sequence of vectors to the reference vector, determine a mean and a variance of each parameter in the reference vector computed over the values in the aligned vectors, thereby constructing said speech reference model from the sequence of vectors.

22. A distributed speech processing system for supporting applications that reside on a cellular telephone handset device, comprising:

an input means for capturing speech training data at the handset device;

a speech recognizer coupled to said input means and receptive of speech training data from said input means;

said speech recognizer being operative to process the speech training data into an intermediate representation of the speech training data and communicate the intermediate representation to a second computing device;

a speech model server residing on said second computing device, said second computing device being interconnected via a network to the handset device;

said speech model server receiving the intermediate representation of the speech training data and generating a speech reference model using the intermediate representation, said speech model server further being operative to communicate the speech reference model to said first computing device; and a lexicon coupled to said speech recognizer for storing the speech reference model on the handset device.

23. The distributed speech processing system of claim 22 wherein said input means is further defined as a keypad for capturing alphanumeric data that serves as speech training data, such that said speech recognizer segments the alphanumeric data into a sequence of symbols which serves as the intermediate representation of the speech training data.

24. The distributed speech processing system of claim 22 wherein said reference model server further comprises a speech model database for storing speaker-independent speech reference models, said reference model server being operative to retrieve a speech reference model from said speech model database that corresponds to the intermediate representation of said speech training data received from said speech recognizer.

25. The distributed speech processing system of claim 22 wherein said speech model server further comprises:
   a phoneticizer receptive of the intermediate representation for producing a plurality of phonetic transcriptions; and
   a model trainer coupled to said phoneticizer for building said speech reference model based on said plurality of phonetic transcriptions.

26. The distributed speech processing system of claim 22 wherein said input means is further defined as a microphone for capturing audio data that serves as speech training data.

27. The distributed speech processing system of claim 26 wherein said speech recognizer converts the audio data into a digital input signal and translates the digital input signal into a vector of parameters which serves as the intermediate representation of the speech training data, said parameters being indicative of the short term speech spectral shape of said audio data.

28. The distributed speech processing system of claim 27 wherein said vector of parameters is further defined as either pulse code modulation (PCM), $\mu$-law encoded PCM, filter bank energies, line spectral frequencies, or cepstral coefficients.

29. The distributed speech processing system of claim 22 wherein said speech model server further comprises:
   a Hidden Markov Model (HMM) database for storing phone model speech data corresponding to a plurality of phonemes; and
   a model trainer coupled to said HMM database for decoding said vector of parameters into a phonetic transcription of the audio data, whereby said phonetic transcription serves as said speech reference model.

30. The distributed speech processing system of claim 22 wherein said speech recognizer captures at least two training repetitions of audio data that serves as the speech training data and converts the audio data into a sequence of vectors of parameters that serves as said intermediate representation of the speech training data, where each vector corresponds to a training repetition and the parameters are indicative of the short term speech spectral shape of said audio data.

31. The distributed speech processing system of claim 30 wherein said speech model server being operative operative to determine a reference vector from the sequence of vectors, align each vector in the sequence of vectors to the reference vector, determine a mean and a variance of each parameter in the reference vector computed over the values in the aligned vectors, thereby constructing said speech reference model from the sequence of vectors.

32. A method of building speech reference models for use in a speech recognition system, comprising the steps of:
   collecting speech training data at a first computing device;
   processing the speech training data into an intermediate representation of the speech training data on said first computing device;
   communicating said intermediate representation of the speech training data to a second computing device, said second computing device interconnected via a network to said first computing device;
   creating a speech reference model from said intermediate representation at said second computing device; and
   communicating said speech reference model to the first computing device for use in the speech recognition system.

* * * * *

UNITED STATES PATENT AND TRADEMARK OFFICE
CERTIFICATE OF CORRECTION

PATENT NO. : 6,463,413 B1
DATED : October 8, 2002
INVENTOR(S) : Ted H. Applebaum and Jean-Claude Junqua It is certified that error appears in the above-identified patent and that said Letters Patent is hereby corrected as shown below:

Title page,
Item [73], Assignee, "Matsushita Electrical Industrial Co., Ltd." should be
-- Matsushita Electric Industrial Co., Ltd. --
Item [56], References Cited, U.S. PATENT DOCUMENTS, the following references should be added:
    -- 5,054,082    10/1991    Smith, et al.
       5,212,730    05/1993    Wheatley, et al.
       5,732,187    03/1998    Scruggs, et al. --

Column 10,
Line 10, "operative operative" should be -- operative --.

Signed and Sealed this

Eighth Day of April, 2003

JAMES E. ROGAN
*Director of the United States Patent and Trademark Office*